US011608052B2

(12) United States Patent
Tanaka et al.

(10) Patent No.: US 11,608,052 B2
(45) Date of Patent: Mar. 21, 2023

(54) VEHICLE

(71) Applicant: Mazda Motor Corporation, Hiroshima (JP)

(72) Inventors: Hiroshi Tanaka, Aki-gun (JP); Satoshi Ueno, Aki-gun (JP); Hiroshi Kinoshita, Aki-gun (JP); Kei Yonemori, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 39 days.

(21) Appl. No.: 17/341,171

(22) Filed: Jun. 7, 2021

(65) Prior Publication Data

US 2022/0001853 A1 Jan. 6, 2022

(30) Foreign Application Priority Data

Jul. 1, 2020 (JP) .............................. JP2020-113717

(51) Int. Cl.
  *B60K 6/46* (2007.10)
  *B60W 20/40* (2016.01)
  (Continued)

(52) U.S. Cl.
  CPC .............. *B60W 20/40* (2013.01); *B60K 6/24* (2013.01); *B60K 6/26* (2013.01); *B60K 6/48* (2013.01)

(58) Field of Classification Search
  CPC .. Y02T 10/62; B60K 6/46; B60K 6/40; B60K 6/405; B60K 6/485; B60K 5/02; B60D 1/64; B60W 20/40
  See application file for complete search history.

(56) References Cited

U.S. PATENT DOCUMENTS 4,973,233 A * 11/1990 Kurio ................... F01C 11/002
                                                29/888.012
5,513,719 A *  5/1996 Moroto .................... B60K 6/24
                                                    903/952
(Continued)

FOREIGN PATENT DOCUMENTS

AT          510748 B1 *  6/2014   ................ F01C 1/22
AT          13720 U1      7/2014
(Continued)

OTHER PUBLICATIONS

JP 2017184507—English Translation (Year: 2017).*
(Continued)

*Primary Examiner* — George C Jin
*Assistant Examiner* — Teuta B Holbrook
(74) *Attorney, Agent, or Firm* — Alleman Hall Creasman & Tuttle LLP

(57) ABSTRACT

Provided is a vehicle capable of suppressing vibration of a drive unit having an engine and a motor to be small and having high vehicle motion performance. The drive unit for travel of the vehicle includes an engine and a motor. The engine is a rotary engine and has an engine output shaft and an engine housing. The motor has a motor output shaft, a rotor, and a stator that are accommodated in a motor housing. The engine housing of the engine and the motor housing of the motor are directly joined to each other. The engine output shaft and the motor output shaft are directly joined to each other. The rotor of the motor has: a main body section that generates a rotational magnetic field with the stator; and a weight section that functions as a balance weight of the engine.

14 Claims, 9 Drawing Sheets

(51) Int. Cl.
    *B60K 6/24*           (2007.10)
    *B60K 6/26*           (2007.10)
    *B60K 6/48*           (2007.10)

(56) References Cited

U.S. PATENT DOCUMENTS

| | | | | |
|---|---|---|---|---|
| 10,286,770 | B2 * | 5/2019 | Yong | B60K 6/40 |
| 2015/0328974 | A1 * | 11/2015 | Okuda | B60K 6/383 |
| | | | | 903/952 |
| 2019/0105979 | A1 | 4/2019 | Yui | |
| 2021/0016765 | A1 | 1/2021 | Toda et al. | |

FOREIGN PATENT DOCUMENTS

| | | | | | |
|---|---|---|---|---|---|
| CN | 101978146 | A | * | 2/2011 | F02B 41/02 |
| CN | 107405992 | A | * | 11/2017 | B60K 6/26 |
| CN | 109414981 | A | * | 3/2019 | B60K 6/40 |
| CN | 208664976 | U | * | 3/2019 | H02K 7/1861 |
| DE | 10017396 | A1 | * | 10/2001 | F02D 41/083 |
| DE | 102006021156 | A1 | | 11/2007 | |
| EP | 2339721 | A2 | * | 6/2011 | H02K 17/16 |
| EP | 3225447 | A1 | * | 10/2017 | B60K 6/40 |
| JP | 2002087080 | A | * | 3/2002 | |
| JP | 2009067216 | A | * | 4/2009 | |
| JP | 2010213460 | A | * | 9/2010 | |
| JP | 2017184507 | A | * | 10/2017 | B60K 6/40 |
| JP | 6428696 | B2 | * | 11/2018 | B60K 6/40 |
| JP | 2019162964 | A | | 9/2019 | |
| KR | 20120074882 | A | | 7/2012 | |
| WO | 2012069197 | A2 | | 5/2012 | |
| WO | WO-2012069197 | A2 | * | 5/2012 | F01C 1/22 |

OTHER PUBLICATIONS

WO 2012069197—English Translation (Year: 2012).*
European Patent Office, Extended European Search Report Issued in Application No. 21181485.0, dated Aug. 19, 2021, Germany, 8 pages.

* cited by examiner

VEHICLE

TECHNICAL FIELD

The present invention relates to a vehicle and, in particular, to a balance weight in a drive unit for travel of the vehicle.

BACKGROUND ART

In recent years, for purposes of reducing an environmental load and the like, hybrid vehicles including a motor in addition to an engine as drive sources for travel of the vehicle have been widespread.

In Patent Document 1, an automobile that includes an engine and a motor as drive sources for travel is disclosed. In the automobile disclosed in Patent Document 1, both of the engine and the motor, which are provided as the drive sources for the travel, are mounted in a front area.

The automobile disclosed in Patent Document 1 can be switched between an engine-drive mode in which the automobile travels by using the engine and a motor-drive mode in which the automobile travels by using the motor. When a driver selects the motor-drive mode, the automobile travels by driving the motor.

Meanwhile, when the driver selects the engine-drive mode, the motor assists with driving at a start of the automobile, and the automobile travels at a specified vehicle speed or higher by driving the engine.

PRIOR ART DOCUMENTS

Patent Documents

Patent Document 1: JP2019-162964A

SUMMARY OF THE INVENTION

Problem to be Solved by the Invention

Further improvement in vehicle motion performance has been requested for the hybrid vehicle as described above. When attempting to improve the vehicle motion performance, it is beneficial to arrange a drive unit, in which the engine and the motor are unitized, in an area near a center of the vehicle. By arranging the drive unit just as described, the vehicle can easily turn, and the vehicle motion performance can be improved. However, since an occupant space is provided in the area near the center of the vehicle, a mounting space for the drive unit is limited in such an area. Thus, in order to improve the vehicle motion performance, downsizing of the drive unit is necessary.

When the drive unit is driven for the travel of the vehicle, vibration (vertical displacement) of the drive unit occurs with a drive wheel being a point of origin. However, it is desired to minimize the vibration of the drive unit during driving from the perspective of improving the vehicle motion performance and securing a sense of comfort for an occupant. In order to achieve this, it is necessary to downsize the drive unit and arrange the drive unit in the area near the center of the vehicle. More specifically, in the case where a rear wheel is the drive wheel, for example, the arrangement of the drive unit in the area near the center of the vehicle shortens a distance between the drive wheel and a tip (an end on an opposite side from the drive wheel) of the drive unit and reduces the vertical displacement (vibration) of the drive unit in comparison with a case where the drive unit is arranged in a front area of the vehicle.

The present invention has been made to solve the problem as described above, and therefore has a purpose of providing a vehicle in which vibration of a drive unit having an engine and a motor is suppressed to be small and which has a high vehicle motion performance.

Means for Solving the Problem

First, the present inventors performed a diligent study on a method for suppressing the vibration of the drive unit during driving and achieving the high vehicle motion performance.

When the drive unit is driven, the engine is a source that generates the vibration with the drive wheel being the point of origin.

Thus, the present inventors first investigated a structure that directly joined a motor housing to an engine housing. The present inventors considered that, by directly coupling the motor housing to the engine housing, the motor's weight would be added to the engine, which could suppress the vibration of the engine.

However, the present inventors found that the vibration during driving of the engine could not sufficiently be suppressed by simply and directly coupling the motor housing to the engine housing. In the case where the suppression of the engine vibration only needs to be considered, a weight increase of the motor housing suffices. However, in this case, the weight of the drive unit as a whole is also increased, which degrades the vehicle motion performance. Thus, the simple increase in the weight of the motor housing cannot be adopted.

Next, the present inventors considered to shorten a length of the drive unit, that is, a dimension of the drive unit in an extending direction of an output shaft. If the length of the drive unit can be shortened, the distance between the drive wheel and the tip (the end on the opposite side from the drive wheel) of the drive unit can be shortened. Thus, the vertical displacement can be suppressed to be small.

Accordingly, the present inventors considered to further downsize the drive unit by not only directly coupling the motor housing to the engine housing and also shortening the length of the drive unit, that is, the dimension of the drive unit in the extending direction of the output shaft. If the length of the drive unit can be shortened, the distance between the drive wheel and the tip (the end on the opposite side from the drive wheel) of the drive unit can further be shortened. Thus, the vertical displacement can be suppressed to be small.

Here, in the engine, an engine output shaft is conventionally provided with a balance weight to suppress the vibration during driving. The balance weight is provided to a longitudinal end of the engine output shaft. Thus, when the motor housing is simply and directly joined to the engine housing as described above, the overall length of the drive unit is increased by the thickness of the balance weight, which is provided to one end side (a side to which the motor is joined) of the engine output shaft.

In view of the above, the present inventors performed the diligent study on a structure that could suppress the increase in the overall length of the drive unit by the thickness of the balance weight while securing a function of the balance weight to suppress the vibration. As a result, the present inventors completed the present invention.

More specifically, a vehicle according to an aspect of the present invention is a vehicle including a drive unit that is a drive source for travel of the vehicle and has an engine and a motor arranged adjacent to each other. The engine has: an engine output shaft that outputs drive power; and an engine housing that constitutes an outer shell of the engine. The motor has: a rotor and a stator; a motor output shaft that is joined to the rotor and outputs drive power; and a motor housing that constitutes an outer shell of the motor. The engine housing and the motor housing are integrally formed or are joined to each other. The engine output shaft and the motor output shaft are integrally formed or are joined to each other in a manner to rotate coaxially and synchronously. The rotor of the motor has: a main body section that generates a rotational magnetic field with the stator; and a weight section that functions as a balance weight of the engine.

In the vehicle according to the above aspect, the drive unit, in which the engine and the motor are unitized, is provided. Thus, compared to a drive unit in which the engine and the motor are not unitized, it is possible to downsize the drive source and to arrange the drive unit at or near a center of the vehicle. More specifically, in the vehicle according to the above aspect, the engine housing and the motor housing are integrally formed or joined, and the engine output shaft and the motor output shaft are integrally formed or joined to each other. Thus, compared to a case where the engine and the motor are disposed with a clearance being interposed therebetween, it is possible to particularly reduce a length thereof (a dimension in an axial direction of the engine output shaft and the motor output shaft). Thus, in the vehicle according to the above aspect, it is possible to improve vehicle motion performance and reduce vibration of the drive unit.

In the vehicle according to the above aspect, since the engine housing and the motor housing are integrally formed or joined to each other, it is possible to add the weight of the motor to the engine. Thus, it is possible to further suppress the vibration (vertical motion) that is generated at the time of driving the engine.

In the above description, being "integrally formed" means being integrally constructed from a single member. More specifically, that "the engine housing and the motor housing are integrally formed" means a state where a part of the single housing is set as the engine housing and another part of such a housing is set as the motor housing. Similarly, that "the engine output shaft and the motor output shaft are integrally formed" means a state where a part of the single shaft is set as the engine output shaft and another part of such a shaft is set as the motor output shaft.

In the vehicle according to the above aspect, the rotor of the motor has the weight section, and the weight section functions as the balance weight of the engine. That is, since the balance weight of the engine and the rotor are integrated, compared to a case where the balance weight is provided to the engine output shaft in addition to the rotor of the motor, it is possible to reduce a length of the drive unit. Thus, it is possible to further suppress the vibration (vertical motion) of the drive unit that is generated with a drive wheel being a point of origin at the time of driving the engine.

In the vehicle according to the above aspect, the engine housing and the motor housing may be joined to each other in a state where an end surface on the motor housing side of the engine housing and an end surface on the engine housing side of the motor housing abut each other, and in an adjacent direction of the engine and the motor, a part of the weight section in the rotor may be in a state of entering the engine housing side from an abutment surface between the engine housing and the motor housing.

In the vehicle according to the above aspect, since the weight section of the rotor is formed such that the part of the weight section is in the state of entering the engine housing side from the abutment surface, it is possible to efficiently use a space by an area acquired by causing the weight section to enter the engine housing side from the abutment surface. Accordingly, in the vehicle according to the above aspect, it is possible to reduce the length of the drive unit (a dimension in the axial direction of the engine output shaft and the motor output shaft), which is further advantageous to suppress the vibration (vertical motion) of the drive unit with the drive wheel being the point of origin.

In the vehicle according to the above aspect, when a direction that is orthogonal to an extending direction of the motor output shaft is set as a radial direction, the weight section may have: an intermediate section that extends obliquely from the motor output shaft side and an opposite side of the engine housing toward an outer side in the radial direction and the engine housing side; and an outer edge section that continues from the intermediate section and extends outward in the radial direction in the case where the weight section of the rotor is seen in a cross section including an axis of the motor output shaft.

In the vehicle according to the above aspect, since the weight section is formed to have the intermediate section that extends obliquely outward to the engine housing side, it is possible to avoid interference of the weight section with the stator in the motor housing, and the like.

In the vehicle according to the above aspect, the outer edge section of the weight section may be provided such that an outer circumferential surface of the outer edge section is located on the outer side in the radial direction from an outer circumferential surface of the main body section.

In the vehicle according to the above aspect, since the outer circumferential surface of the outer edge section in the weight section is located on the outer side in the radial direction from the outer circumferential surface of the main body section, it is possible to easily suppress the vibration at the time of driving the engine, and the weight section provided as the part of the rotor effectively functions as the balance weight of the engine.

In the vehicle according to the above aspect, the outer edge section of the weight section may be provided such that the outer circumferential surface of the outer edge section is located on the outer side in the radial direction from an inner circumferential surface of the stator.

In the vehicle according to the above aspect, since the outer circumferential surface of the outer edge section in the weight section is located on the outer side in the radial direction from the inner circumferential surface of the stator, it is possible to further easily suppress the vibration at the time of driving the engine, and the weight section provided as the part of the rotor effectively functions as the balance weight of the engine.

In the vehicle according to the above aspect, the engine may further have a unit-end balance weight that is joined to a portion on an opposite side from a side where the motor adjoins in the engine output shaft, and the weight section may be provided to have a larger diameter than the unit-end balance weight.

In the vehicle according to the above aspect, since the unit-end balance weight is provided to the engine output shaft, compared to a case where the vibration at the time of driving the engine is suppressed only by the weight section of the rotor in the motor, it is possible to further reliably suppress the vibration (vertical motion) of the engine.

In the vehicle according to the above aspect, the weight section may be provided such that a rotation phase thereof is a substantially reverse phase from that of the unit-end balance weight.

In the vehicle according to the above aspect, since the rotation phase of the weight section in the rotor is the substantially reverse phase (approximately 180 deg.) from that of the unit-end balance weight, it is possible to effectively suppress the vibration of the engine.

In the vehicle according to the above aspect, when the weight section is seen from one side in the axial direction of the motor output shaft, the weight section may have a fan shape.

In the vehicle according to the above aspect, since the weight section in the rotor has the fan shape, it is possible to adjust weight distribution in a circumferential direction between the engine output shaft and the motor output shaft, which is advantageous to further reliably suppress the vibration.

In the vehicle according to the above aspect, the engine output shaft and the motor output shaft may directly be joined to each other.

In the vehicle according to the above aspect, the engine output shaft and the motor output shaft are directly joined to each other. Thus, compared to a case where the engine output shaft and the motor output shaft are connected with a coupling or the like being interposed therebetween, the rotation phase between the engine output shaft and the motor output shaft is unlikely to be shifted, and this is advantageous for the weight section in the rotor to stably function as the balance weight that suppresses the vibration of the engine.

In the vehicle according to the above aspect, the engine may be a rotary engine having a rotary piston.

As described above, in the case where the rotary engine is adopted as the engine, compared to a case where a reciprocating engine is adopted as the engine, it is possible to downsize the drive unit. Since the rotary engine is used at a higher engine speed than the reciprocating engine, the vibration thereof is large. However, as described above, since the drive unit can be arranged further on the center side of the vehicle by reducing the length of the drive unit, it is possible to reduce a distance between the drive wheel and a tip of the drive unit (an end on an opposite side from the drive wheel), and thus vertical vibration of the drive unit can sufficiently be suppressed to be small.

In the vehicle according to the above aspect, the drive unit may have a plurality of the rotary engines, the engine housing may have a cylindrical shape and accommodate a plurality of the rotary pistons, the motor housing may have a cylindrical shape and accommodate the rotor and the stator, and the engine housing and the motor housing may directly be joined to each other by fastening means.

As described above, the cylindrical engine housing and the cylindrical motor housing are directly joined to each other by the fastening means. In this way, it is possible to downsize the drive unit. Accordingly, in the case where the above configuration is adopted, it is possible to arrange the drive unit further on the center side of the vehicle, and it is thus possible to reduce a distance between the drive wheel and a tip of the drive unit (the end on the opposite side from the drive wheel). Therefore, in the case where the above configuration is adopted, it is possible to further reliably suppress the vertical vibration of the drive unit.

Advantage of the Invention

In the vehicle according to each of the above aspects, it is possible to suppress the vibration of the drive unit having the engine and the motor to be small and to have the high vehicle motion performance.

MODES FOR CARRYING OUT THE INVENTION

Figure 1:
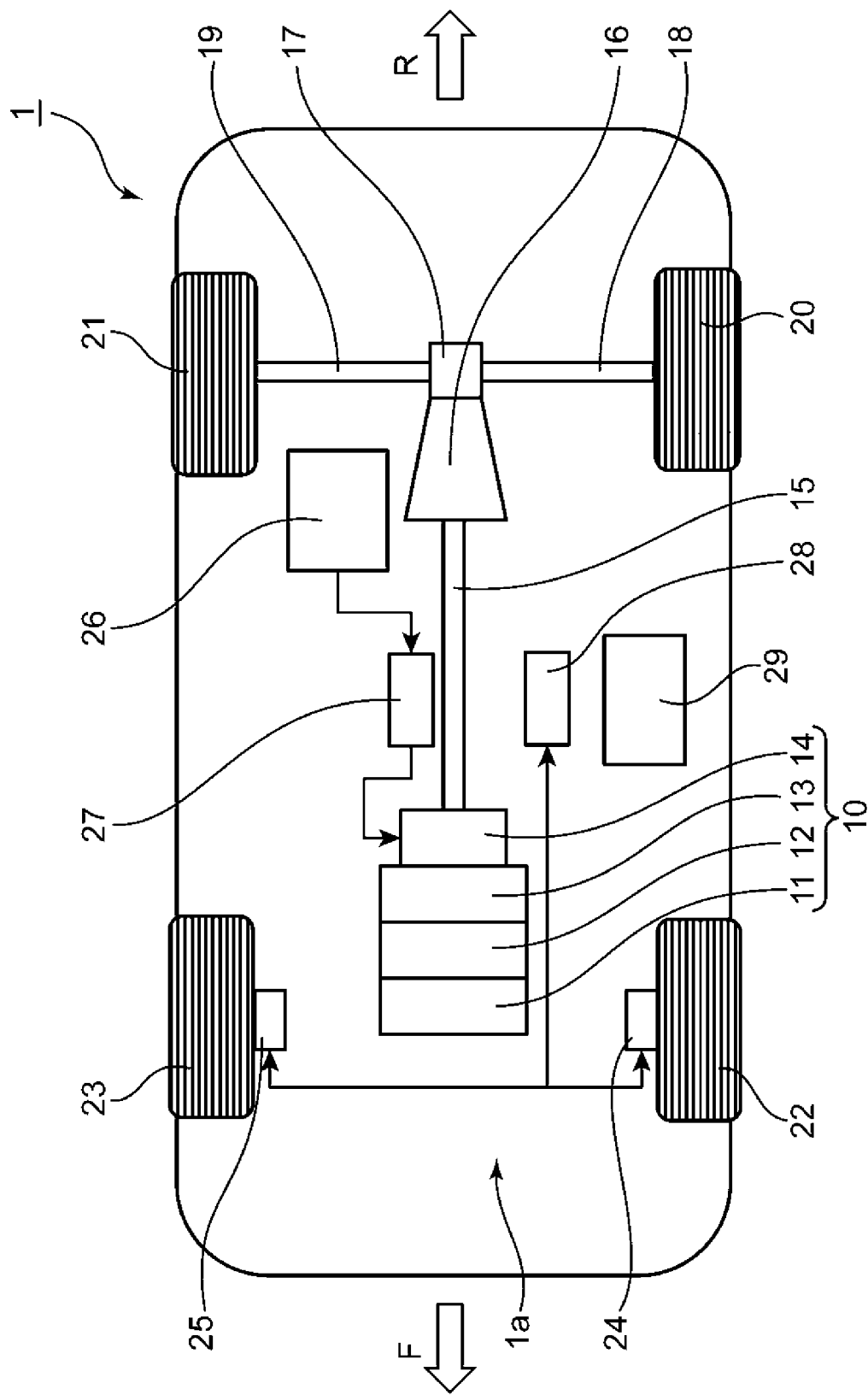
FIG. 1 is a schematic view illustrating an outline configuration of a vehicle according to an embodiment.

A description will hereinafter be made on an embodiment of the present invention with reference to the drawings. The embodiment, which will be described below, merely constitutes an example of the present invention, and the present invention is not limited to the following embodiment in any respect except for an essential configuration thereof.

In the drawings used for the following description, "F," "R," "U," "L," "Le," and "Ri" respectively indicate a front side of a vehicle, a rear side of the vehicle, an upper side of the vehicle, a lower side of the vehicle, a left side of the vehicle, and a right side of the vehicle.

EMBODIMENT

1. Schematic Configuration of Vehicle 1

A description will be made on a schematic configuration of a vehicle 1 according to this embodiment with reference to FIG. 1.

As illustrated in FIG. 1, in the vehicle 1, a drive unit 10 for driving the vehicle 1 is mounted in a rear portion of a front area 1*a*. The drive unit 10 includes engines 11 to 13 and a motor 14. A detailed structure of the drive unit 10 will be described below.

A propeller shaft 15 is connected to an output shaft of the drive unit 10 (a motor output shaft of the motor 14). The propeller shaft 15 extends rearward at a center in a vehicle width direction of the vehicle 1. A rear end of the propeller shaft 15 is connected to a transmission 16.

A differential gear 17 is connected to the transmission 16. Driveshafts 18, 19 are respectively coupled to left and right portions of the differential gear 17 in the vehicle width direction. The driveshafts 18, 19 are respectively connected to rear wheels (drive wheels) 20, 21. That is, the vehicle 1 according to this embodiment travels by driving the rear wheels 20, 21 as the drive wheels using drive power that is generated by the drive unit 10 mounted in the front area 1*a*.

In the vehicle 1, motors 24, 25 are respectively connected to front wheels 22, 23. Although not illustrated in detail, each of the motors 24, 25 is a so-called in-wheel motor. Each of the motors 24, 25 functions as an assist motor that generates power at a start of the vehicle 1 and transmits the power to respective one of the front wheels 22, 23. Each of the motors 24, 25 also functions as a regenerative brake that generates electricity during deceleration of the vehicle 1. The electricity, which is generated by the motors 24, 25 during the deceleration of the vehicle 1, is stored in a capacitor 28 or the like.

A battery 26 and an inverter 27 are also mounted to the vehicle 1. The battery 26 is an electricity storage module for supplying the electricity to the motor 14 in the drive unit 10. The battery 26 according to this embodiment is a lithium-ion battery, for example. The electricity from the battery 26 is supplied to the motor 14 via the inverter 27.

Here, the vehicle 1 according to this embodiment has, as drive modes of the drive unit 10, an engine-drive mode and a motor-drive mode. The engine-drive mode is a mode in which the vehicle 1 travels by driving the rear wheels (drive wheels) 20, 21 using drive power that is output from the engines 11 to 13. The motor-drive mode is a mode in which the vehicle 1 travels by driving the rear wheels (drive wheels) 20, 21 using the drive power that is output from the motor 14.

The vehicle 1 is configured that the motor 14 does not generate the drive power at the time of driving in the engine-drive mode and the engines 11 to 13 do not generate the drive power at the time of driving in the motor-drive mode.

In the vehicle 1, a drive mode control unit 29 executes switching control between the engine-drive mode and the motor-drive mode. The drive mode control unit 29 is configured to include a microcomputer that has a processor (i.e., a central processing unit (CPU)), memory (i.e., ROM and/or RAM), and the like. The drive mode control unit 29 executes a drive mode control on the basis of an instruction from a driver, a situation of the vehicle 1 (a vehicle speed, acceleration/deceleration, a battery remaining amount), or the like.

2. Mounting Position of Drive Unit 10

Figure 2:
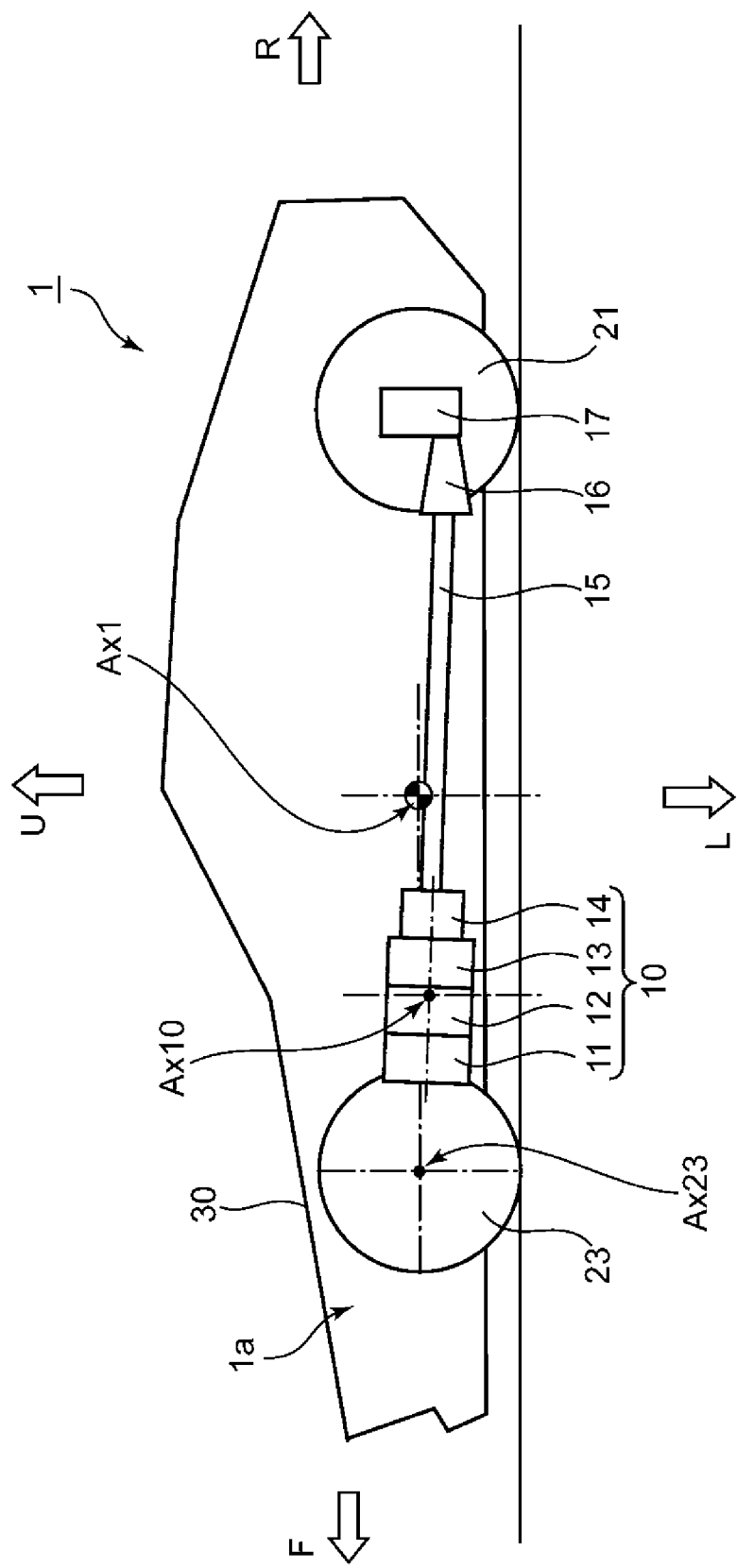
FIG. 2 is a schematic view illustrating a mounting position of a drive unit in the vehicle.

A description will be made on a mounting position of the drive unit 10 in the vehicle 1 with reference to FIG. 2.

As described above, in the vehicle 1, the drive unit 10 is mounted in the rear portion of the front area 1a. More specifically, the drive unit 10 is mounted such that center of gravity Ax10 of the drive unit 10 is located behind rotation center Ax23 of the front wheels 22, 23 (only the front wheel 23 is illustrated in FIG. 2). In addition, the drive unit 10 is mounted such that the center of gravity Ax10 thereof is located below the rotation center Ax23 of the front wheels 22, 23.

That is, in the vehicle 1, the drive unit 10 as a heavy object is made to be compact, and the drive unit 10 is mounted in the rear portion of the front area 1a and in a lower portion having a clearance from a hood 30. In this way, a position Ax1 of center of gravity of the vehicle 1 can be set to a low position substantially at the center in a longitudinal direction of the vehicle 1.

3. Configurations of Drive Unit 10 and Peripheries

A description will be made on a detailed configuration of the drive unit 10 and configurations of peripheries thereof with reference to FIG. 3 and FIG. 4.

Figure 3:
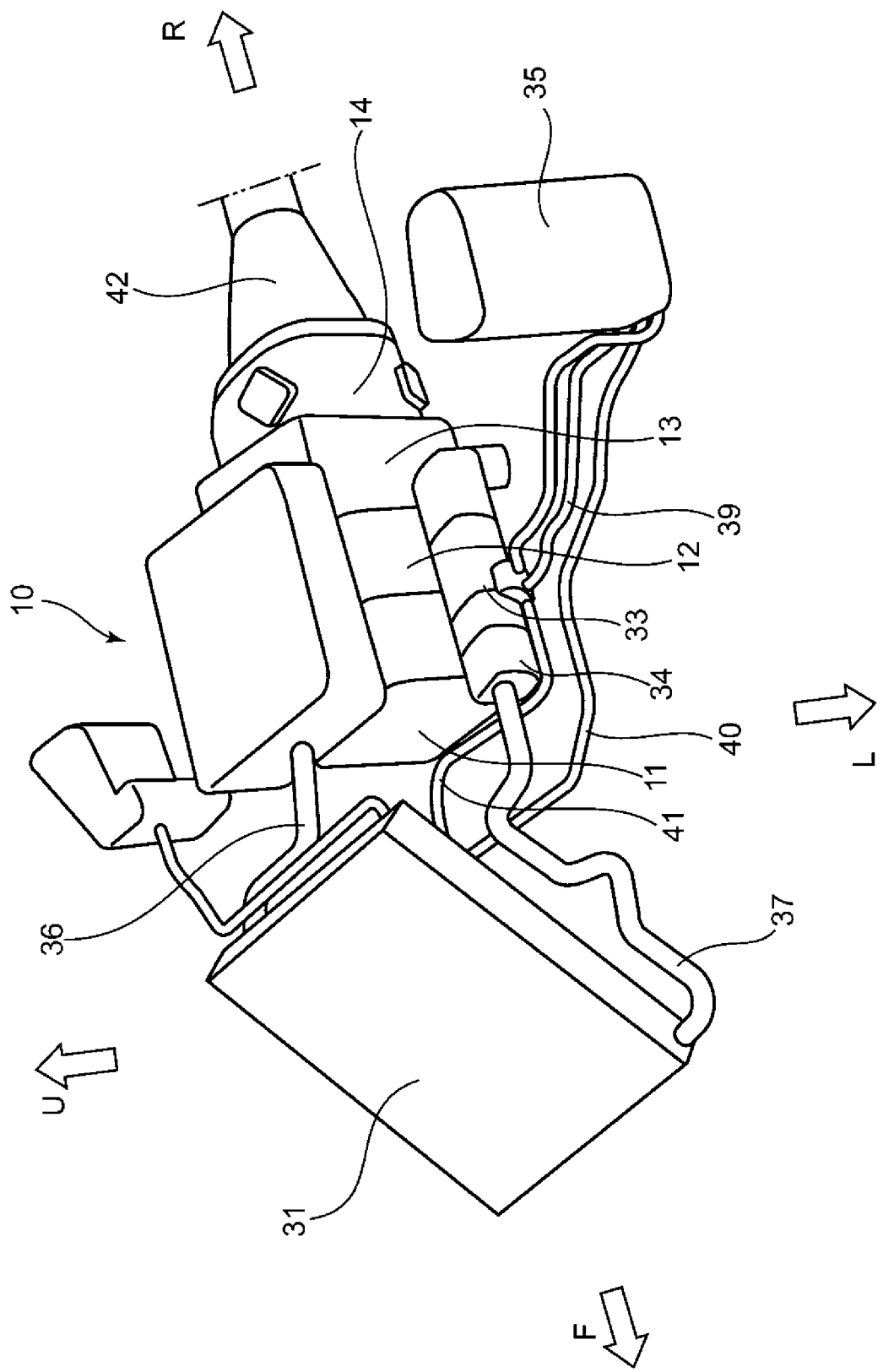
FIG. 3 is a perspective view illustrating a configuration of the drive unit.
Figure 4:
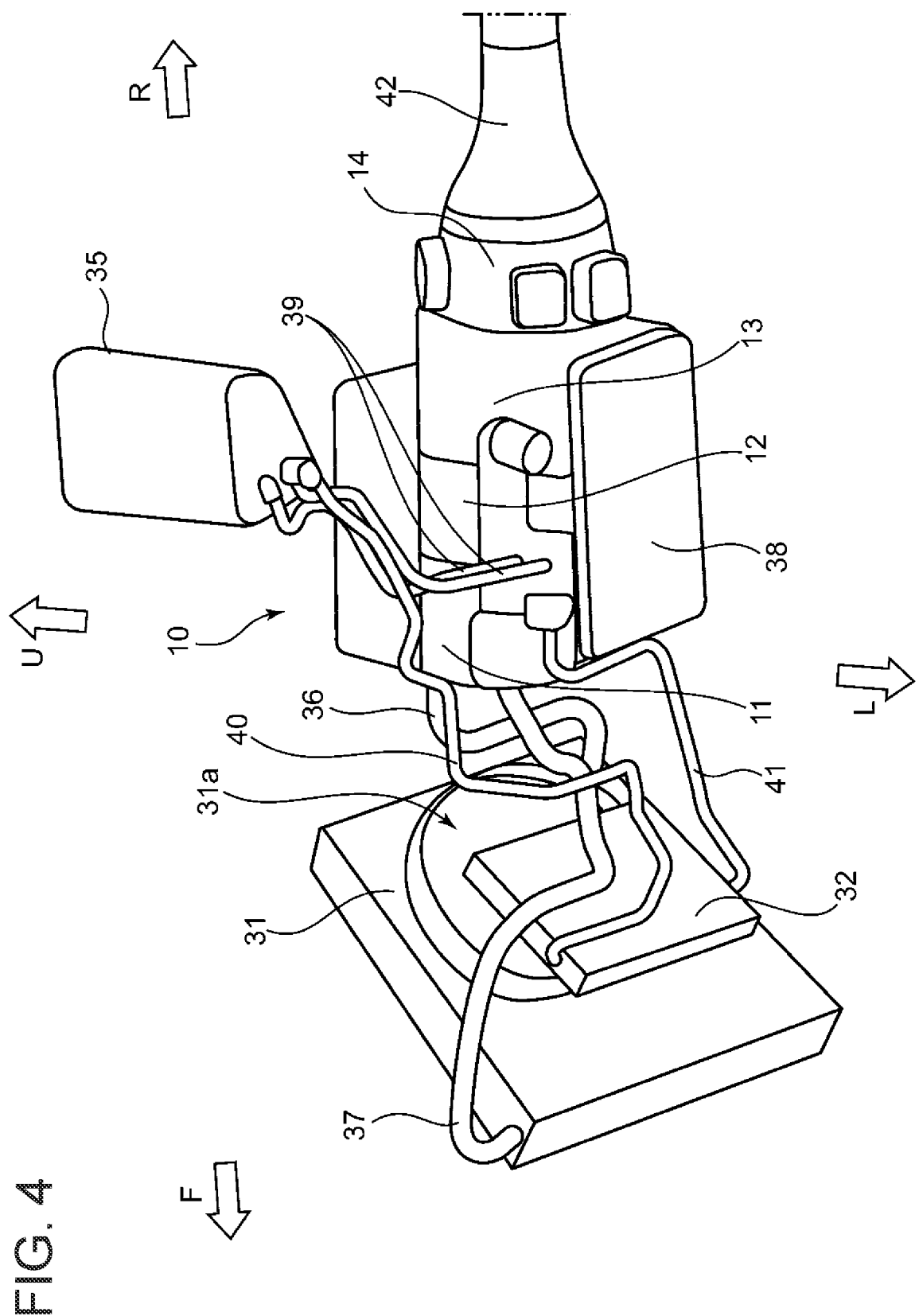
FIG. 4 is a perspective view illustrating the configuration of the drive unit.

As illustrated in FIG. 3 and FIG. 4, each of the engines 11 to 13 provided in the drive unit 10 is a rotary engine that has a rotary piston. The adoption of the rotary engine as each of the engines 11 to 13 in the vehicle 1 is beneficial for downsizing of the drive unit 10.

As illustrated in FIG. 4, an oil pan 38 is disposed below the engines 11 to 13. The oil pan 38 has a flat shape in which a dimension in a height direction is smaller than dimensions in the vehicle longitudinal direction and the vehicle width direction. This is beneficial to suppress a height of the drive unit 10 to be low.

As described above, in the vehicle 1 according to this embodiment, the oil pan 38 has the flat shape, and thus an accommodation volume of engine oil therein is low. For this reason, the oil pan 38 has a primary purpose of collecting the engine oil that has flowed through the engines 11 to 13. Thus, an oil tank 35 is provided on a side of the drive unit 10 to store the engine oil collected in the oil pan 38.

As illustrated in FIG. 3 and FIG. 4, a radiator 31 and an oil cooler 32 are disposed in front of the drive unit 10. The radiator 31 is a device for cooling a coolant, a temperature of which has become high by heat from the engines 11 to 13, and has a radiator fan 31a on a rear side thereof.

The oil cooler 32 is arranged behind the radiator 31 and is disposed along the radiator 31. The oil cooler 32 has a smaller plane size than the radiator 31. Pipes 36, 37 connect the engines 11 to 13 and the radiator 31. A water pump 34 is provided to a connection portion between the pipe 37 and each of the engines 11 to 13.

Two each of the oil cooler 32, the engines 11 to 13, the oil tank 35, and the oil pan 38 are connected by respective one of pipes 39 to 41 and the like. An oil pump 33 is provided to a connection portion between the pipe 41 and each of the engines 11 to 13.

The motor 14 in the drive unit 10 is arranged adjacent to a rear side of the engine 13. The engines 11 to 13 and the motor 14 have a direct-coupling structure to share an output shaft. In a vertical direction and the vehicle width direction of the vehicle 1, the motor 14 is formed to have a smaller external size than each of the engines 11 to 13.

A torque tube 42 is joined to an end surface on a rear end side of the motor 14.

4. Joint Structure Between Engines 11 to 13 and Motor 14 in Drive Unit 10

A description will be made on a joint structure between the engines 11 to 13 and the motor 14 in the drive unit 10 with reference to FIG. 5.

Figure 5:
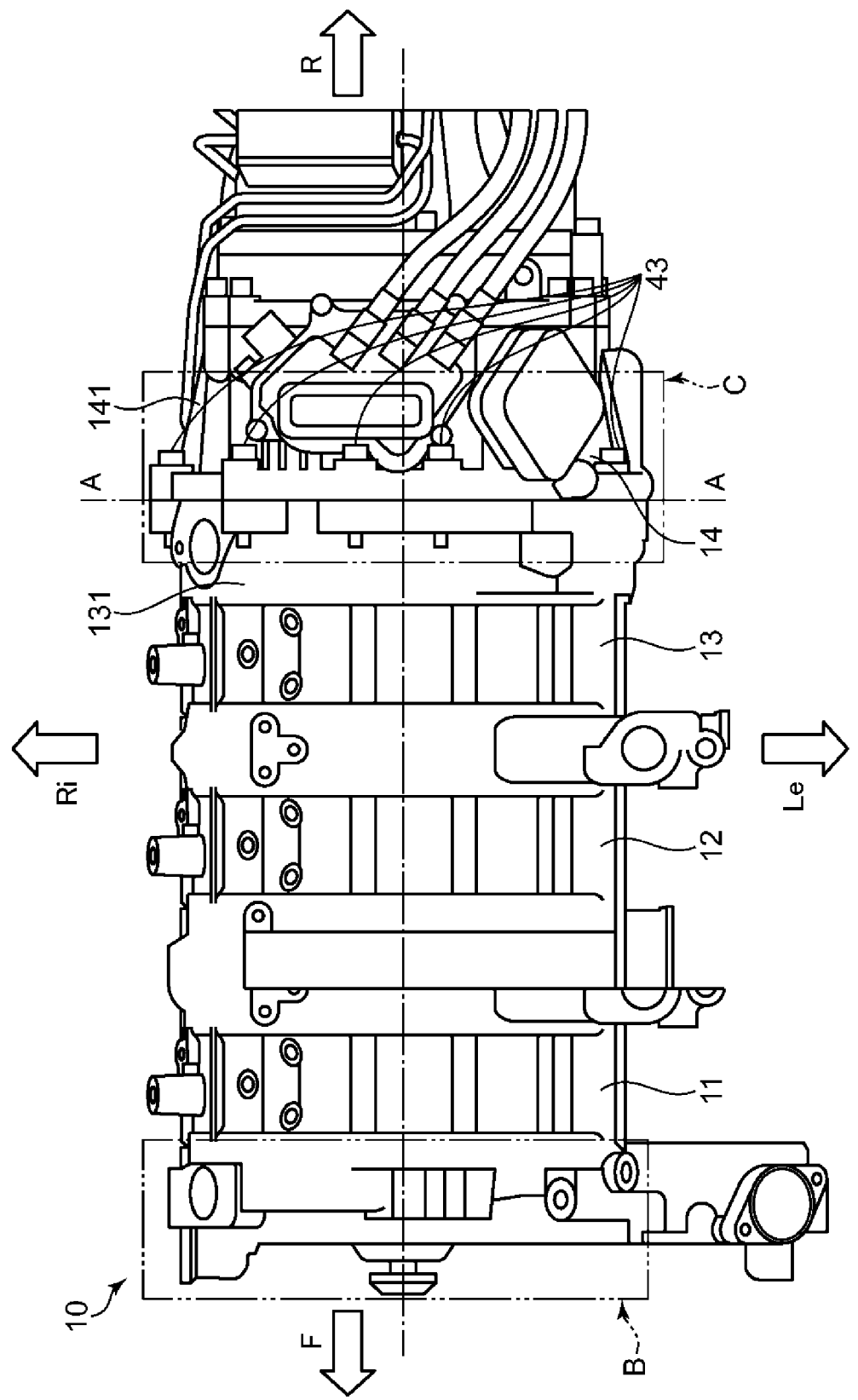
FIG. 5 is a plan view in which the drive unit is seen from above.

As illustrated in FIG. 5, the engines 11 to 13 share an engine housing 131 that constitutes an outer shell. The engine housing 131 is a cylindrical member and accommodates a rotary piston and an engine output shaft.

The motor 14 has a motor housing 141 that constitutes an outer shell. The motor housing 141 is also a cylindrical member and accommodates a rotor/stator and the motor output shaft.

The engine housing 131 and the motor housing 141 abut each other in the longitudinal direction of the vehicle 1 (an abutment surface A-A) and are directly joined to each other by a plurality of bolts (fasteners) 43. Here, "directly joined" includes not only a case where a flange surface of the engine housing 131 and a flange surface of the motor housing 141 are joined to each other in a directly abutting state but also a case where the engine housing 131 and the motor housing 141 are joined to each other with packing being interposed therebetween.

5. Internal Configuration of Motor 14

A description will be made on an internal configuration of the motor 14 with reference to FIG. 6.

Figure 6:
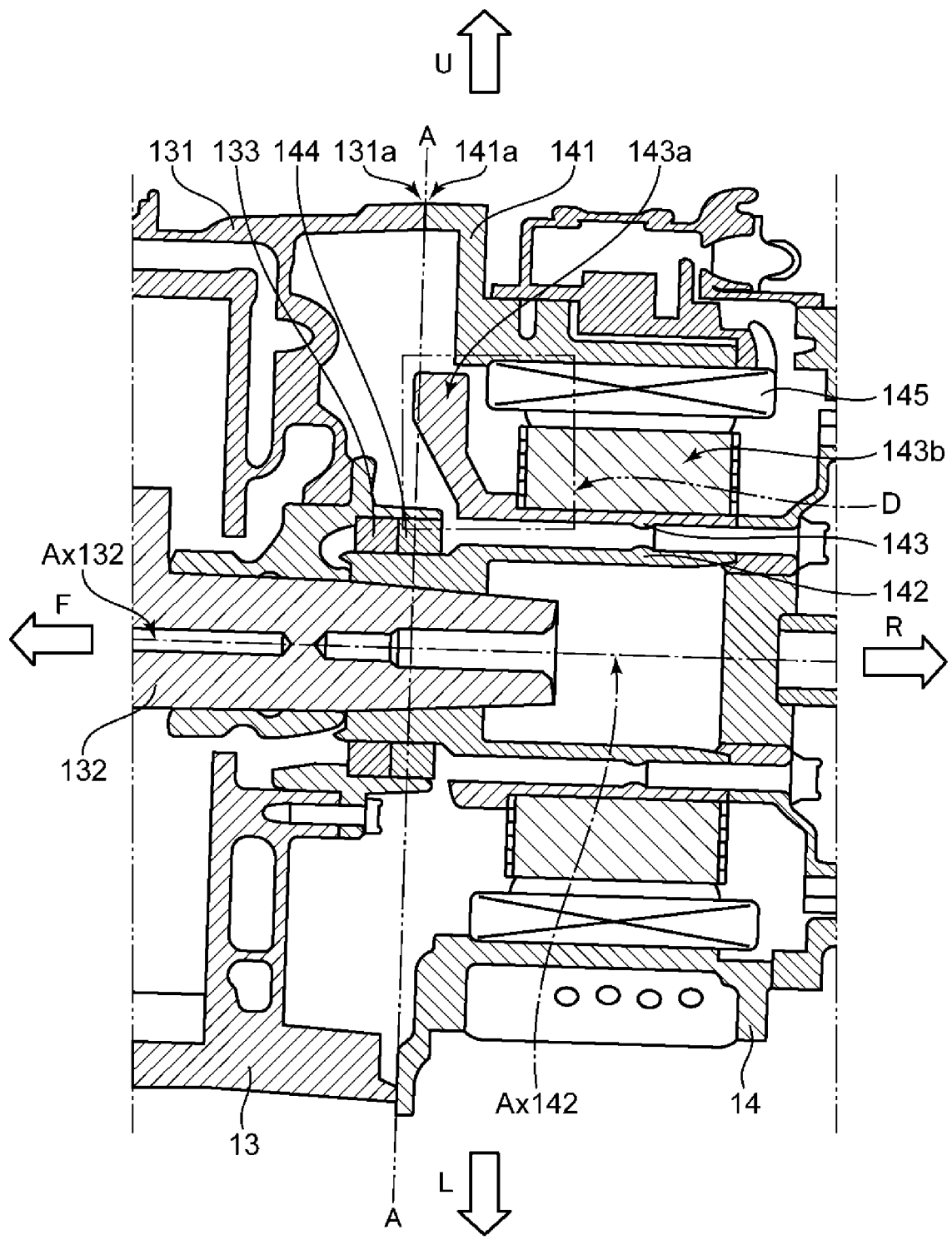
FIG. 6 is a cross-sectional view illustrating an internal configuration of section C in FIG. 5.

As illustrated in FIG. 6, the engine housing 131 accommodates an engine output shaft 132 that extends in the longitudinal direction of the vehicle 1. The engine housing 131 also accommodates a ring-shaped oil seal 133 in a boundary portion with the motor 14.

The motor housing 141 accommodates a motor output shaft 142 that extends in the longitudinal direction of the vehicle 1 in a similar manner to the engine output shaft 132, a rotor 143 that is joined to an outer circumference of the motor output shaft 142, and a stator 145. The motor housing 141 also accommodates a ring-shaped oil seal 144 in a boundary portion with the engine 13.

In the engine housing 131 and the motor housing 141, a rear end surface 131*a* of the engine housing 131 and a front end surface 141*a* of the motor housing 141 abut each other on the abutment surface A-A and are directly joined to each other by the plurality of bolts (fasteners) 43 (see FIG. 5).

The engine output shaft 132 and the motor output shaft 142 are directly joined to each other in a manner to rotate synchronously and such that an axis Ax132 of the engine output shaft 132 is coaxial with an axis Ax142 of the motor output shaft 142. That is, in the engines 11 to 13 and the motor 14, the engine output shaft 132 and the motor output shaft 142 are directly joined to each other.

The rotor 143 of the motor 14 is joined to the motor output shaft 142 and has: a weight section 143*a* that extends toward the engine 13 side (a front side); and a main body section 143*b* that is disposed on a radially inner side of the stator 145. The main body section 143*b* of the rotor 143 is a member that generates a rotational magnetic field with the stator 145. In this embodiment, as an example, the main body section 143*b* of the rotor 143 is a permanent magnet, and the stator 145 is a coil.

6. Structure of Weight Section 143*a* in Rotor 143

A description will be made on a structure of the weight section 143*a* in the rotor 143 with reference to FIG. 7 and FIG. 8.

Figure 7:
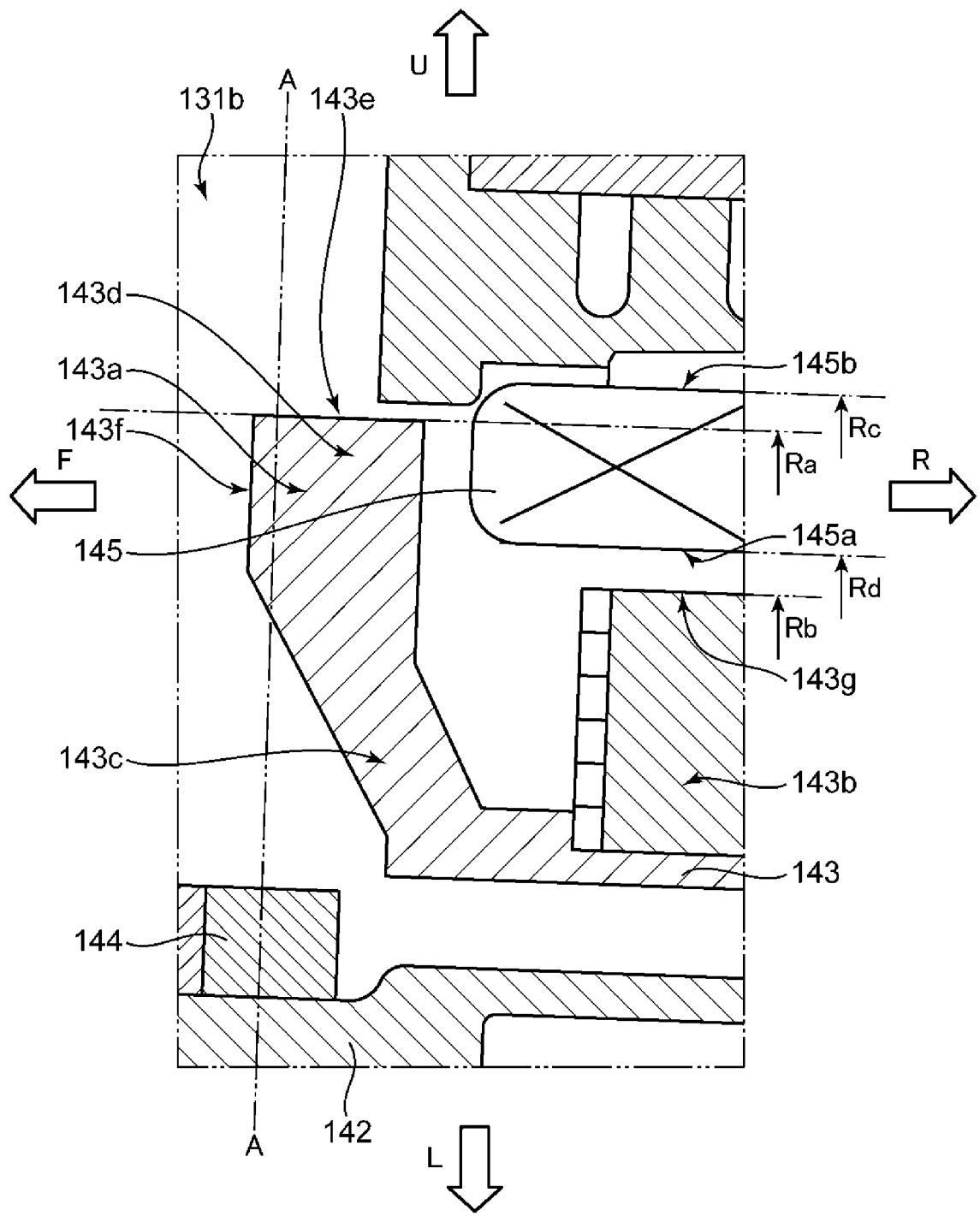
FIG. 7 is a cross-sectional view in which section D in FIG. 6 is enlarged.

As illustrated in FIG. 7, the weight section 143*a* of the rotor 143 is disposed in front of the main body section 143*b* and the stator 145 (on an internal space 131*b* side of the engine housing 131). The weight section 143*a* has an intermediate section 143*c* and an outer edge section 143*d* in an order from the motor output shaft 142 side. The intermediate section 143*c* is provided to extend obliquely from the rear side to the front side as extending from the motor output shaft 142 side to a radially outer side. The outer edge section 143*d* is provided such that an outer circumferential portion of the outer edge section 143*d* continues from the intermediate section 143*c* and the outer edge section 143*d* extends radially outward. The outer edge section 143*d* is provided to be thicker than the intermediate section 143*c*.

The "radial direction" in the present specification indicates a direction that is orthogonal to the axis Ax132 of the engine output shaft 132 (see FIG. 6) and the axis Ax142 of the motor output shaft 142 (see FIG. 6).

Figure 8:
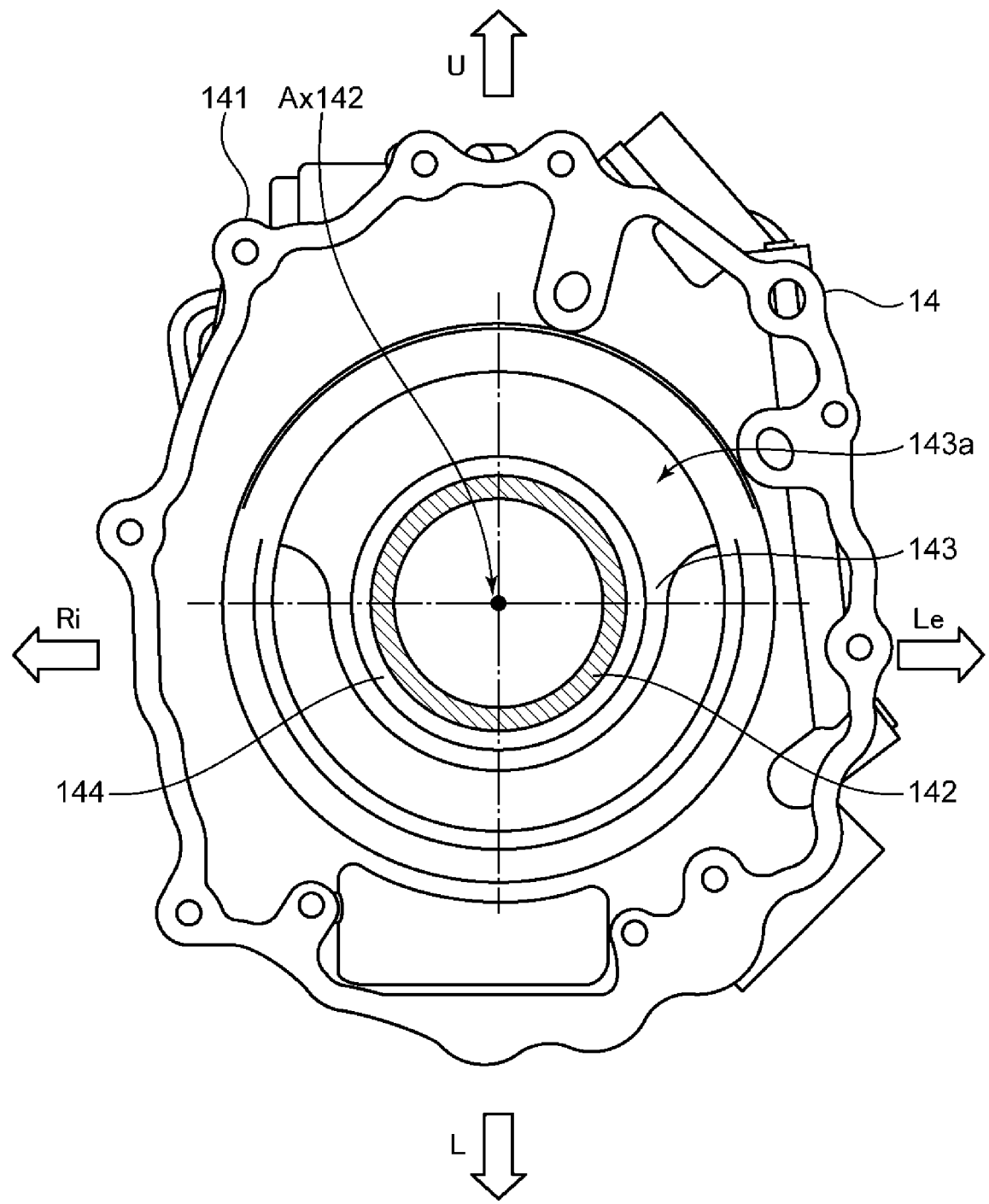
FIG. 8 is a front view in which the motor in the drive unit is seen from front.

As illustrated in FIG. 8, when the motor 14 is seen from the front side in the front view, the weight section 143*a* of the rotor 143 substantially has a fan shape. The rotor 143 including the weight section 143*a* rotates about the axis Ax142 in an integrated manner with the motor output shaft 142.

Referring back to FIG. 7, a front end surface 143*f* of the outer edge section 143*d* is located on the engine housing 131 side from the abutment surface A-A between the engine housing 131 and the motor housing 141. In other words, a part (a front portion) of the outer edge section 143*d* in the weight section 143*a* is in a state of entering the engine housing 131 side (front side) from the abutment surface A-A between the engine housing 131 and the motor housing 141.

Here, the oil seal 144 is disposed on a radially inner side on the abutment surface A-A between the engine housing 131 and the motor housing 141. However, since the weight section 143*a* has the intermediate section 143*c* that extends obliquely, interference between the weight section 143*a* and the oil seal 144 is prevented.

A distance (radius) Ra from the axis Ax142 of the motor output shaft 142 (not illustrated in FIG. 7) to an outer circumferential surface 143*e* of the outer edge section 143*d* satisfies the following relationship with a distance (radius) Rb from the axis Ax142 to an outer circumferential surface 143*g* of the main body section 143*b*.

$$Ra > Rb \qquad \text{(Formula 1)}$$

In addition, the radius Ra satisfies the following relationship with a distance (radius) Rd from the axis Ax142 to an inner circumferential surface 145*a* of the stator 145 to a distance (radius) Rc from the axis Ax142 to an outer circumferential surface 145*b*.

$$Rc > Ra > Rd \qquad \text{(Formula 2)}$$

7. Structure of Balance Weight 111

In the vehicle 1 according to this embodiment, a balance weight (a unit-end balance weight) 111 is provided in a front portion of the drive unit 10. A description will be made on a structure of the balance weight 111 with reference to FIG. 9.

Figure 9:
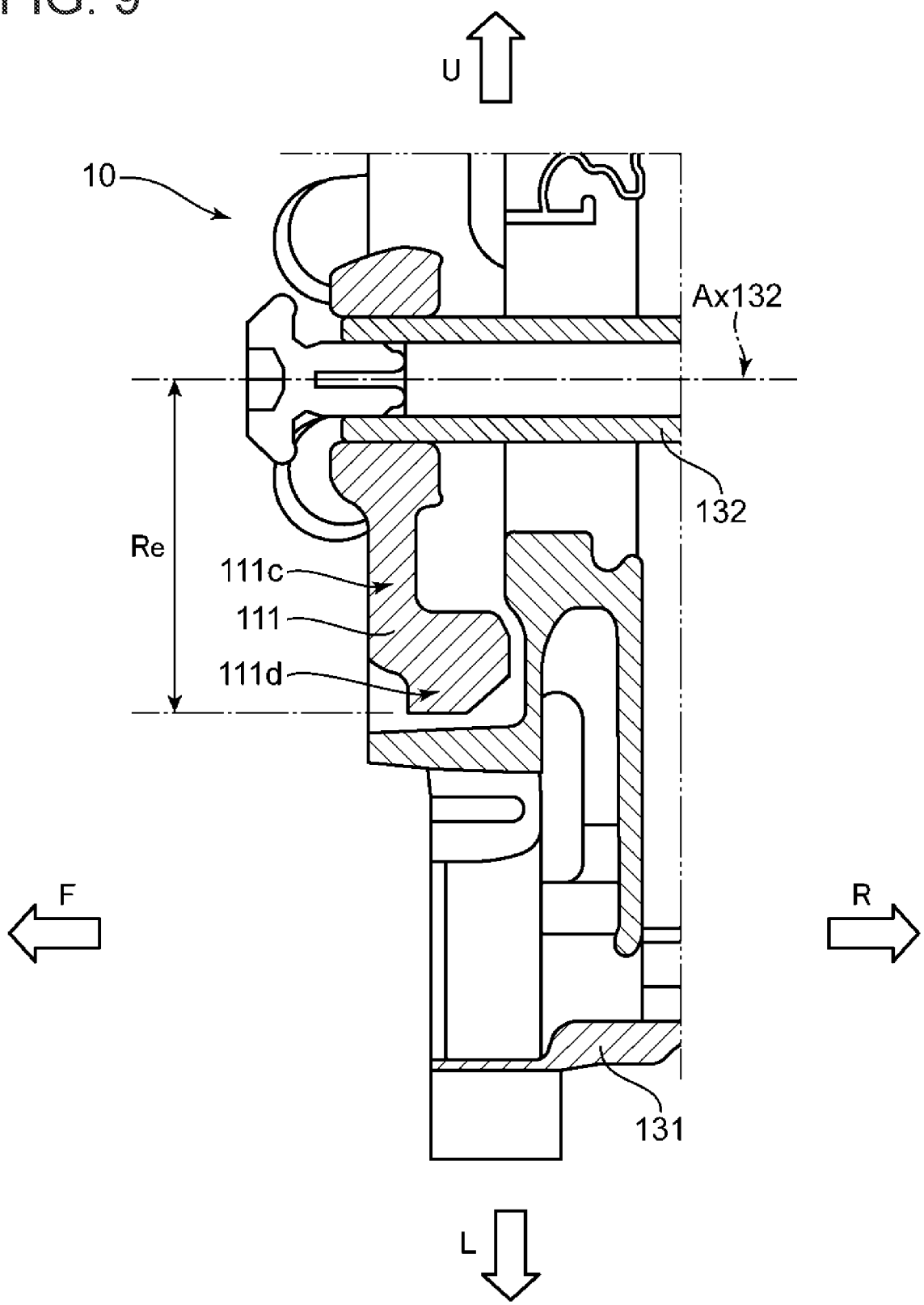
FIG. 9 is a cross-sectional view illustrating an internal configuration of section B in FIG. 5.

As illustrated in FIG. 9, the balance weight 111 that is provided in the front portion of the drive unit 10 is joined to the engine output shaft 132 and has an intermediate section 111*c* and an outer edge section 111*d*. The intermediate section 111*c* is provided to extend radially outward from the engine output shaft 132 side. In the balance weight 111, the intermediate section 111*c* is provided to extend in an orthogonal direction to the axis Ax132 of the engine output shaft 132.

The outer edge section 111*d* is provided such that an outer circumferential portion thereof continues from the intermediate section 111*c* and the outer edge section 111*d* extends radially outward. The outer edge section 111*d* is provided to be thicker than the intermediate section 111*c*.

Although not illustrated in FIG. 9, the balance weight 111 also has a fan shape in the front view.

Here, in the vehicle 1 according to this embodiment, a distance (radius) Re from the axis Ax132 of the engine output shaft 132 to an outer circumferential surface of the outer edge section 111*d* satisfies the following relationship with the above radius Ra.

$$Re < Ra \qquad \text{(Formula 3)}$$

Modified Examples

In the vehicle 1 according to the above embodiment, the engine housing 131 and the motor housing 141 are separately formed and joined to each other on the abutment surface A-A. However, the present invention is not limited thereto. In the present invention, it is also possible to adopt such a structure that the engine housing and the motor housing are integrally molded, that is, such a structure that a part of the single housing is used as the engine housing and another part of the housing is used as the motor housing.

In addition, in the vehicle 1 according to the above embodiment, the engine output shaft 132 and the motor output shaft 142 are separately formed and are directly joined to each other in the manner to rotate synchronously and such that the axis Ax132 is coaxial with the axis Ax142.

However, the present invention is not limited thereto. In the present invention, it is also possible to adopt such a structure that the engine output shaft and the motor output shaft are integrally formed, that is, such a structure that a part of the single shaft is used as the engine output shaft and another part of the shaft is used as the motor output shaft.

Furthermore, the engine output shaft and the motor output shaft may be joined to each other with a coupling member being interposed therebetween. However, when this configuration is adopted, the rotational phase between the engine output shaft and the motor output shaft are set to be the same.

In the above embodiment, the balance weight (unit-end balance weight) 111 is provided in the front portion of the drive unit 10. However, the present invention may not be provided with the unit-end balance weight.

In the above embodiment, each of the balance weight 111 and the weight section 143a of the rotor 143 in the motor 14 has the fan shape in the front view. However, the shapes of the balance weight 111 and the weight section 143a in the front view are not limited thereto. Each of the balance weight 111 and the weight section 143a in the front view may have a strip shape or a half-oval shape.

In the above embodiment, the weight section 143a of the rotor 143 has the intermediate section 143c and the outer edge section 143d. However, the weight section 143a can have any of various cross-sectional shape under a condition that the interference with the peripheral portion is avoided. For example, the weight section having a step-like cross-sectional shape can be adopted.

In the above embodiment, a rotation phase between the balance weight 111 and the weight section 143a is not particularly described. However, the rotation phase can be determined in consideration of a vibration characteristic of the engine, or the like. For example, the rotation phase of the balance weight 111 and the weight section 143a can be set to a substantially reverse phase. Here, the term "approximately" described above includes such meaning that displacement (a difference) of less than 1 deg. from the reverse phase (a phase difference is 180 deg.) is present, for example.

In the above embodiment, the rotary engine is adopted as the example of each of the engines 11 to 13. However, a reciprocating engine can be adopted for the present invention. Also, in the case where the reciprocating engine is adopted as the engine, the same effects as those in the above embodiment can be exerted by integrating a flywheel that corresponds to the balance weight for the reciprocating engine with the rotor in the motor.

In the above embodiment, an FR (front engine, rear-wheel drive) vehicle is adopted as an example of the vehicle 1. However, the present invention is not limited thereto. For example, an RR (rear engine, rear-wheel drive) vehicle, in which the drive unit is mounted in a rear portion and transmits the drive power to rear wheels, an MR (mid-engine, rear-wheel drive) vehicle, in which the drive unit is mounted to a position behind a driver's seat to transmit the drive power to rear wheels, or further an FF (front engine, front-wheel drive) vehicle, in which the drive unit is mounted to a rear portion of a front area to transmit the drive power to front wheels, can be adopted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1 vehicle
10 drive unit
11 to 13 engine (rotary engine)
14 motor
15 propeller shaft
20, 21 rear wheel (drive wheel)
43 bolt (fastener)
111 balance weight (unit-end balance weight)
111c intermediate section
111d outer edge section
131 engine housing
132 engine output shaft
141 motor housing
142 motor output shaft
143 rotor
143a weight section
143b main body section
143c intermediate section
143d outer edge section
145 stator

The invention claimed is:

1. A vehicle, comprising:
a drive unit that is a drive source for travel of the vehicle and includes an engine and a motor arranged adjacent to each other, wherein the engine includes:
an engine output shaft that outputs drive power; and
an engine housing that constitutes an outer shell of the engine,
the motor includes:
a rotor and a stator;
a motor output shaft that is joined to the rotor and outputs drive power; and
a motor housing that constitutes an outer shell of the motor,
the engine housing and the motor housing are joined to each other in a state where an end surface on the motor housing side of the engine housing and an end surface on the engine housing side of the motor housing abut each other,
the engine output shaft and the motor output shaft are integrally formed or are joined to each other in a manner to rotate coaxially and synchronously,
the rotor of the motor includes:
a main body section that generates a rotational magnetic field with the stator; and
a weight section that functions as a balance weight of the engine, and
in an adjacent direction of the engine and the motor, a part of the weight section in the rotor is in a state of entering the engine housing side from an abutment surface between the engine housing and the motor housing.

2. The vehicle according to claim 1, wherein
when a direction that is orthogonal to an extending direction of the motor output shaft is set as a radial direction, the weight section includes:
an intermediate section that extends obliquely from the motor output shaft side and an opposite side of the engine housing toward an outer side in the radial direction and the engine housing side; and
an outer edge section that continues from the intermediate section and extends outward in the radial direction in the case where said weight section of the rotor is seen in a cross section including an axis of the motor output shaft.

3. The vehicle according to claim 2, wherein the outer edge section of the weight section is provided such that an outer circumferential surface of the outer edge section is located on the outer side in the radial direction from an outer circumferential surface of the main body section.

4. The vehicle according to claim 3, wherein the outer edge section of the weight section is provided such that the outer circumferential surface of said outer edge section is located on the outer side in the radial direction from an inner circumferential surface of the stator.

5. The vehicle according to claim 4, wherein
the engine further includes a unit-end balance weight that is joined to a portion on an opposite side from a side where the motor adjoins in the engine output shaft, and
the weight section is provided to have a larger diameter than the unit-end balance weight.

6. The vehicle according to claim 5, wherein the weight section is provided such that a rotation phase thereof is a substantially reverse phase from that of the unit-end balance weight.

7. The vehicle according to claim 6, wherein when the weight section is seen from one side in an axial direction of the motor output shaft, the weight section has a fan shape.

8. The vehicle according to claim 7, wherein
the engine output shaft and the motor output shaft are directly joined to each other.

9. The vehicle according to claim 1, wherein the engine is a rotary engine having a rotary piston.

10. The vehicle according to claim 9, wherein
the drive unit includes a plurality of the rotary engines,
the engine housing includes a cylindrical shape and accommodates a plurality of the rotary pistons,
the motor housing includes a cylindrical shape and accommodates the rotor and the stator, and
the engine housing and the motor housing are directly joined to each other by fasteners.

11. The vehicle according to claim 1, wherein when the weight section is seen from one side in an axial direction of the motor output shaft, the weight section includes a fan shape.

12. The vehicle according to claim 11, wherein the engine output shaft and the motor output shaft are directly joined to each other.

13. The vehicle according to claim 1, wherein the engine output shaft and the motor output shaft are directly joined to each other.

14. The vehicle according to claim 1, wherein
the motor is arranged adjacent to a rear side of the engine, and
the engine and the motor have a direct-coupling structure to share an output shaft.

* * * * *